United States Patent
Stephens

[11] 3,639,067
[45] Feb. 1, 1972

[54] GLASSWARE INSPECTION APPARATUS EMPLOYING FIBER-OPTIC GUIDES

[72] Inventor: Edward J. Stephens, Manchester, Conn.
[73] Assignee: Emhart Corporation, Bloomfield, Conn.
[22] Filed: June 29, 1970
[21] Appl. No.: 56,092

Related U.S. Application Data

[63] Continuation of Ser. No. 827,106, May 15, 1969, abandoned, Continuation of Ser. No. 403,837, Oct. 14, 1964, abandoned.

[52] U.S. Cl. ........................................356/240, 250/223 B
[51] Int. Cl. ...............................................G01n 21/32
[58] Field of Search..................356/240; 250/223 B

[56] References Cited

UNITED STATES PATENTS

| | | | |
|---|---|---|---|
| 1,542,183 | 6/1925 | Steinberg | 128/398 |
| 1,751,584 | 3/1930 | Hansell | 178/6.7 |
| 2,643,767 | 1/1953 | Baker | 356/240 |
| 3,030,516 | 4/1962 | Seavey | 250/223 B |
| 3,069,553 | 12/1962 | Zoltanski | 356/240 |
| 3,089,594 | 5/1963 | Early | 209/111.7 |
| 3,188,478 | 6/1965 | Binks | 250/219 |
| 3,244,894 | 4/1966 | Steele et al. | 250/227 |
| 3,255,357 | 6/1966 | Kapany et al. | 250/227 |
| 3,265,901 | 8/1966 | Schnieder | 250/223 |
| 3,287,564 | 11/1966 | Gore et al. | 250/223 B |
| 3,349,906 | 10/1967 | Calhoun et al. | 356/240 |
| 3,365,699 | 1/1968 | Foster | 356/240 |
| 3,394,263 | 7/1968 | Baker | 356/240 |

*Primary Examiner*—Ronald L. Wibert
*Assistant Examiner*—Orville B. Chew, II
*Attorney*—McCormick, Paulding & Huber

[57] ABSTRACT

Optical glassware inspection apparatus with rotating upright ware at an inspection station and fiber-optic bundles employed for light source and/or reflected light pickup devices with light source and pickup centerlines tangential to the ware and perpendicular to each other, the pickup device having a vertically elongated scanning head.

3 Claims, 8 Drawing Figures

PATENTED FEB 1 1972　　3,639,067

INVENTOR.
EDWARD J. STEPHENS

BY McCormick, Paulding & Huber
ATTORNEYS

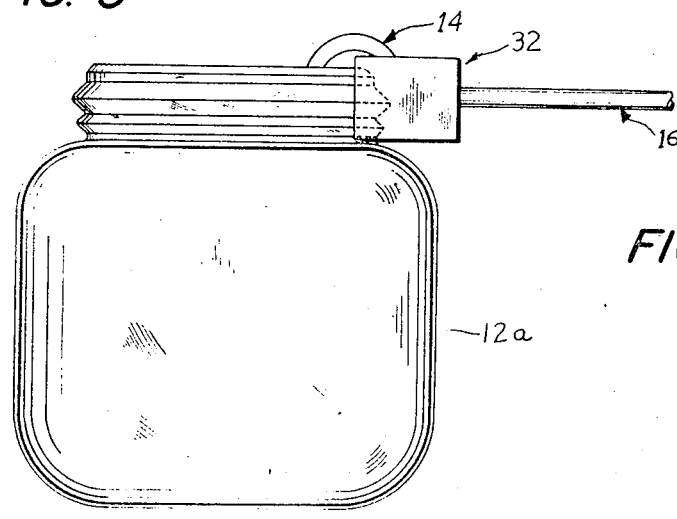
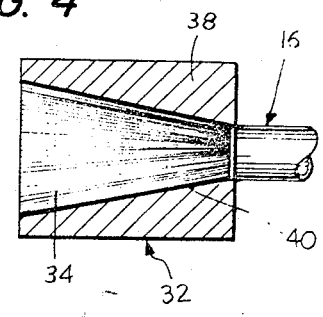
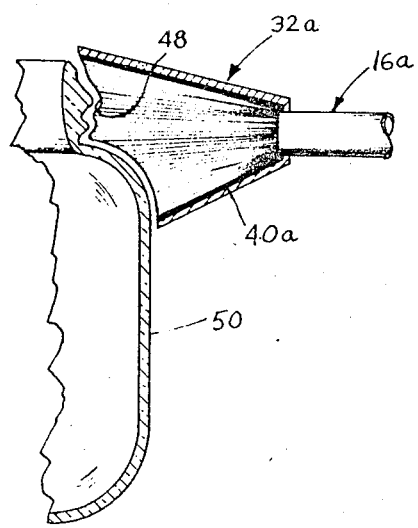
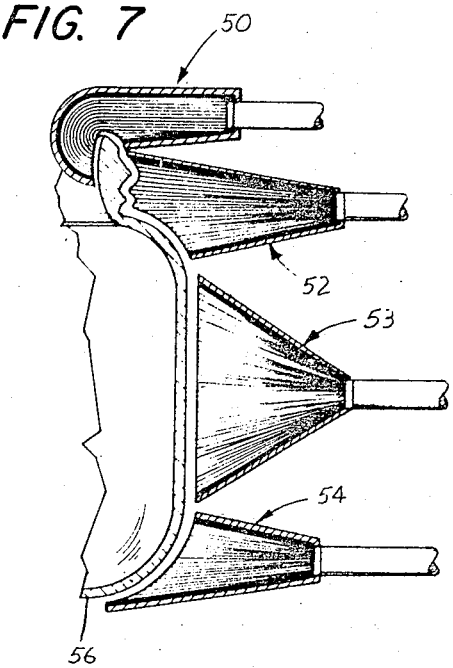
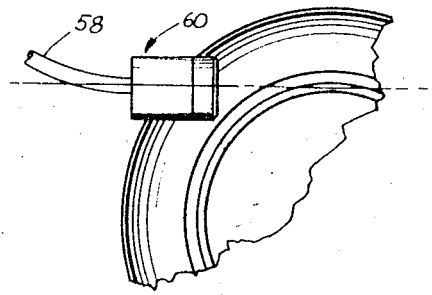

GLASSWARE INSPECTION APPARATUS EMPLOYING FIBER-OPTIC GUIDES

CROSS-REFERENCE TO RELATED APPLICATIONS

This application is a continuation of application Ser. No. 827,106 entitled GLASSWARE INSPECTION APPARATUS EMPLOYING FIBER OPTIC GUIDES, filed May 15, 1969; now abandoned, which application is in turn a continuation of application Ser. No. 403,837 entitled GLASSWARE INSPECTION APPARATUS EMPLOYING FIBER OPTIC GUIDES, filed Oct. 14, 1964, now abandoned, all applications being in the name of Edward J. Stephens.

This invention relates to glassware inspection apparatus and has as its general object the miniaturization of elements such as light-receiving and source units in such apparatus.

In fulfillment of this object, fiber optic guides or bundles are employed as light receiving and transmitting units and/or as light source units and a small but compact and yet highly efficient glassware inspection apparatus is provided.

The drawings show preferred embodiments of the invention and such embodiments will be described, but it will be understood that various changes may be made from the constructions disclosed, and that the drawings and descriptions are not to be construed as defining or limiting the scope of the invention, the claims forming a part of this specification being relied upon for that purpose.

Of the drawings:

FIG. 3 is a side view of the elements shown in FIG. 2;

FIG. 4 is a vertical section through a portion of a light-receiving unit which includes a scanning head and is taken generally as indicated at 4—4 in FIG. 2;

FIG. 6 is a vertical sectional view through an alternative form of scanning head and light-receiving unit;

FIG. 7 is a vertical sectional view through several scanning heads and light-receiving units in a further alternative embodiment of the invention; and FIG. 8 is an enlarged schematic illustration in plan view similar to FIG. 2 but showing a further alternative embodiment of the invention.

Glassware inspection apparatus heretofore available has been generally satisfactory but certain disadvantages have been encountered in operation of the apparatus. Light-receiving units such as photoelectric cells and light source units have been relatively large and bulky so as to cause difficulty in arranging such elements particularly when setting up for a change in the type of glassware under inspection. Tedious and time-consuming operations involving cut and try methods have been employed in such setup procedures and very often the size and bulkiness of the elements has resulted in interference where two such elements might desirably have occupied the same space. Thus, there have been obvious limitations upon the number of light source and receiving units usable, this arising from the interference problems encountered, and in certain setup operations it has been found impossible to illuminate and view all required portions of an article of glassware at one time. Still further, the versatility of the apparatus has left much to be desired in the accommodation of certain types of glassware.

As will be explained more fully hereinbelow, fiber optic guides or bundles provide a means of viewing relatively large areas on articles of glassware with very small viewing or light-receiving devices. Any and all parts or portions of articles of glassware can thus be viewed without the problems of physical interference of viewing elements and highly efficient detection of defects is yet achieved. Close positioning of the fiber optic viewing elements and a wide angle of vision of the elements contribute to this latter achievement such that effectiveness and efficiency of operation exceeds that of prior inspection apparatus.

Figure 1:
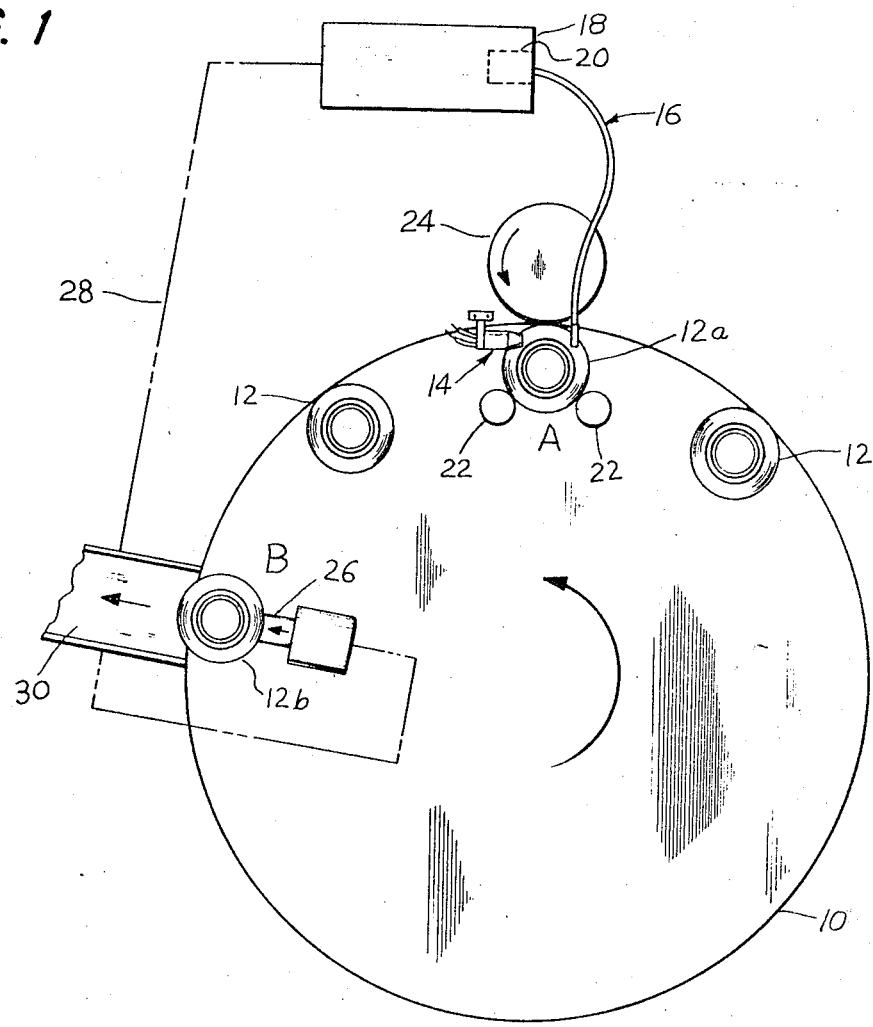
FIG. 1 is a schematic illustration in plan view of a glassware inspection apparatus embodying the present invention.

In accordance with the present invention, fiber optic guides or bundles are employed as light-receiving and/or light source elements and they may be incorporated in substantially any and all prior inspection apparatus. Baker Pat. No. 2,643,767 and Miles et al. Pat. No. 2,902,151 represent prior inspection apparatus wherein the teaching of the present invention may be employed as does application Ser. No. 382,837, filed July 15, 1964, and entitled "MECHANISM FOR HANDLING GLASS CONTAINERS." For purposes of illustration only and without limitation, apparatus of the general type shown in Baker Pat. No. 2,643,767 is employed in the schematic of FIG. 1 and is described in general terms hereinbelow.

A turntable 10 may be rotated or indexed intermittently in a counterclockwise direction by conventional means, not shown, whereby to move articles of glassware 12 from at least one ware inspection station to a ware rejection station. Thus, the turntable 10 serves as a conveyor and transports articles of glassware 12 in succession to a ware inspection station A and a ware rejection station B, an article of glassware 12a being shown at the inspection station A and an article of ware 12b being shown at the rejection station. Glassware may, of course, be loaded onto the turntable either manually or automatically by means not shown and acceptable ware similarly removed from the table. Defective glassware is removed from the table at the rejection station B as will be described hereinbelow.

At the inspection station A at least one light source unit is provided as at 14 and at least one elongated flexible light receiving and transmitting device is employed in accordance with the invention. Such a device is shown at 16 in FIG. 1 and comprises a fiber optic guide or bundle which extends from a position adjacent the article of glassware 12a to a control unit 18. The control unit 18 includes a light detector such as a photoelectric cell or photodiode and the end portion of the receiving and transmitting device 16 is operatively associated with the detector so as to transmit light thereto. A broken line 20 may be taken as representing the position of a light detector in the control 18. Associated with the light detector 20 in the control 18 in the conventional manner is an amplifying means which may comprise a preamplifier and an amplifier and a means, which may comprise a thyratron, for operating a rejection mechanism. All of these elements are conventional in prior glassware inspection apparatus need not be described in detail here.

Referring further to the inspection station A, a means for effecting relative rotation between an article of glassware such as 12a and a light-receiving end portion of the receiving and transmitting device 16 is provided. While the invention is not so limited, the article of glassware is rotated in FIG. 1 in a conventional manner and the light guide 16 is maintained in a fixed position as is the light source unit 14. Glassware-supporting rollers 22 are provided for cooperation with a somewhat larger ware rotating roller 24. Said rollers may be conventional as with means for driving the same, not shown.

At the rejection station B, a reciprocable plunger 26 is operated on signal from the light receiving and transmitting device 16 and the control 18 to reject articles of glassware such as 12b when defects are viewed therein by the said device 16. The plunger 26 is shown connected with the control 18 schematically by the broken line 28 and is adapted to urge the defective articles of glassware 12b leftwardly from the turntable 10 and onto a downwardly inclined chute 30. Plunger 26 is of course maintained in a retracted position so as not to interfere with the passage of acceptable articles of glassware to an unloading station.

Figure 2:
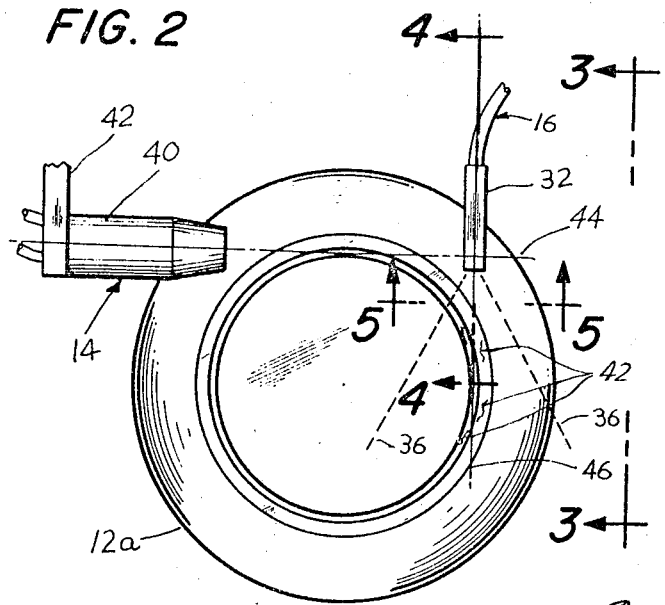
FIG. 2 is an enlarged fragmentary schematic illustration in plan view of the apparatus showing a light source unit and a light-receiving unit in association with an article of glassware.
Figure 5:
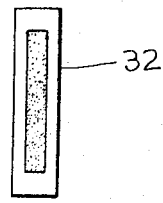
FIG. 5 is an end view of the scanning head of FIG. 4 and is taken generally as indicated at 5—5 in FIG. 2.

As best illustrated in FIGS. 2 and 3, the light-receiving end portion of the flexible light receiving and transmitting element 16 preferably includes a scanning head such as the head 32. The receiving and transmitting member 16 in FIG. 2 may comprise a fiber optic guide or bundle as mentioned and may be of a relatively small diameter, as for example one-eighth of an inch, such that the scanning head 32 serves to broaden the field of vision of the end portion of the guide or bundle at least in one direction. As will be seen in FIGS. 4 and 5, the individual fibers 34 within the guide or bundle 16 are arranged in a fan configuration in the scanning head 32. There is in fact no appreciable space between fibers and several layers of fibers may be found even in the narrow horizontal dimension in FIG. 5, this being due to the comparatively small size of the fibers. Still further with respect to field of vision, it is to be observed that a 60° field is common with fiber optic guides or bundles as indicated at 36 in FIG. 2 and as much as a 90° field has been obtained. For this reason a horizontally narrow and vertically broad scanning head such as shown in FIG. 5 can provide highly efficient operation. A slight loss in the field of vision in the horizontal plane can in fact be advantageous in the elimination of extraneous light and "noise" in the apparatus. The broad field of vision in the vertical plane is of course advantageous in covering a large area on the article of glassware as indicated in FIG. 3. Actual width of the fiber band in FIG. 5 may be on the order of 0.025 inch and actual height slightly less than five-eighths of an inch.

Still referring to FIGS. 4 and 5 in particular, the scanning head 32 will be seen to include a housing 38 and a potting compound 40 disposed within the housing and securing the fibers 34, in the desired position. The potting compound may comprise an epoxy resin. Alternatively, no separate housing such as 38 may be provided and instead, the potting compound itself may be employed as the housing for the scanning head.

The light source at 14 comprises a housing or shield 40 which contains a small low-wattage bulb and a focusing lens in accordance with the presently preferred form of the invention. A bracket may be provided at 42 for securing the light source unit in position.

The location of the light-receiving and light source units may vary widely with respect to each other and with respect to the article of glassware within the scope of the present invention. Various types of defects in the article of glassware will of course require different locations of these elements. The particular arrangement of elements shown in FIG. 2, however, is highly efficient particularly in the detection of vertical and angular "checks" such as 42 in the article of glassware 12a. The said article of glassware comprises a baby food jar and the arrangement of light source and receiving units shown has been found to provide highly efficient operation and results with jars of both the lug and screw thread type.

In the particular arrangement of FIG. 2, the beam of light provided by the light source unit 14 is focused as mentioned above and is directed approximately horizontally and tangentially toward the lug or thread surface as shown. A centerline 44 of the beam of light which is cast upon the article of glassware preferably extends slightly closer to the inner jar surface than the outer jar surface as shown. A centerline 46 of the receiving unit or scanning head 32 is shown extending at right angles with respect to the centerline 44 and is preferably approximately tangential and slightly closer to the inner surface of the lug or thread section as shown. With this arrangement, it is thought that the jar itself may serve somewhat in the nature of a light guide or bundle such that the beam of light emitted by the light source 14 travels through the lug or thread portion of the jar "around the corner" and is reflected from defects such as 42 to the scanning head 32. It is believed further that a "quiet zone" exists in the area where the defects 42 are shown such that highlights from the lugs or threads do not significantly affect the scanning head and the other control elements so as to provide a high noise level. Instead, a desirably low noise level is achieved and a high signal-to-noise ratio is provided in the control.

Still with regard to the arrangement of elements, but apart from the specific arrangement of FIG. 2, it is thought highly desirable in all instances to provide the light-receiving end portion of the fiber optic guide or bundle in very closely spaced relationship with the article of glassware. It is presently believed that the scanning head or light-receiving end portion of the guide or bundle should be placed substantially as close as the eccentricity of the article of glassware will permit. An outer limit in placement of the scanning head or light-receiving end portion is believed to fall at approximately 1 inch from the article of glassware. Placement of the scanning head or light-receiving end portion of the guide or bundle in close proximity to the article of glassware is believed to contribute to the excellent noise to signal ratios achieved with the inspection apparatus. Due to the comparatively wide angle of vision of the scanning head or end portion of the fiber optic guide or bundle, reflected light rays are received as required and yet the close spacing precludes the introduction of excessive extraneous light as might otherwise cause substantial noise. Extraneous light may arise, for example, from reflection of light from machine or apparatus elements.

Referring now particularly to FIG. 6, it will be observed that a fiber optic bundle or guide 16a has an associated scanning head 32a. The scanning head 32a is similar to the scanning head 32 described above but employs the potting compound 40a as a housing and includes a contoured rather than a planar front or scanning end surface 48. The contoured surface 48 may be provided by machining after the scanning head has been potted and the contour is obviously so devised as to conform at least approximately with the configuration of the outer surface of an adjacent article of glassware 50. With this arrangement, the light-receiving end portions of the fibers or the scanning head surface 48 may be disposed even in closer proximity to the outer surface of an article of glassware to provide for excellent reception of light rays reflected from defects and for elimination of extraneous light.

In FIG. 7 there is shown a construction wherein substantially the entire surface of an article of glassware can be inspected with the use of fiber optic guides or bundles. Scanning heads 50, 52, 53 and 54 are provided each with a contoured front end surface adapted to conform closely to the configuration of the adjacent surface of an article of glassware such as 56.

In FIG. 8 there is shown an alternative embodiment of the present invention wherein all elements may correspond exactly with those described above for FIG. 2 except for the light source 14. A second fiber optic guide or bundle 58 is provided in this embodiment and is arranged to transmit light to an article of glassware from a light source not shown. The light source may be conventional and the end portion of the fiber optic bundles 58 adjacent the article of glassware may be held by a suitable bracket to direct light tangentially on the article as mentioned, or the direction of a light beam cast by the guide or bundle may of course be conveniently altered. Optionally, a focusing lens may be provided at the end of the fiber optic guide or bundle between the end portion thereof and the article of glassware and a small lens housing is shown accordingly at 60.

From the foregoing it will be apparent that a desirably small and compact inspection apparatus has been provided. Due to the very small size of the light source and receiving units employed, an almost limitless variety of arrangements of such units is obtainable. Inspection can thus be undertaken for substantially all known types of defects and many if not all defects may be examined for in a simultaneous operation.

The apparatus is substantially more versatile than prior comparatively large and bulky apparatus. Due to the comparatively wide field of vision of the fiber optic guides or bundles, precise location of the receiving end portion of a bundle or a scanning head is not essential as in the case of a large focused photoelectric cell. In one inspection procedure involving baby food jars of the type shown, a 5 minute setup time was required with the present apparatus whereas conventional inspection apparatus utilizing the comparatively large and bulky inspection elements aforesaid would have required two or three separate setups requiring a total of 4 to 5 hours of setup time. Moreover, a single light source and a single receiving unit were employed with the present apparatus. Three photocells and two light sources would have been required with the older apparatus.

Finally, the use of the fiber optic guides and bundles and the close spacing and scanning head arrangements of the invention permit the use of extremely low-wattage bulbs in the light sources with corresponding reduction in power requirements of the apparatus. High-intensity light is not needed due to the excellent light pickup characteristics and the broad field of vision of the fiber optic guide receiving end portions. Such use of low-intensity light is also believed to contribute to the excellent signal-to-noise ratios achieved with the apparatus.

I claim:

1. Glassware defect inspection apparatus comprising a conveyor for transporting ware in an upright attitude from at least one ware inspection station to a rejection station, ware rejection means at said rejection station, at least one light source at said inspection station arranged to cast a beam of light on a substantially horizontal centerline which is generally tangential with respect to an article of glassware at the station, at least one light receiving and transmitting device at said inspection station, said receiving and transmitting device comprising an elongated flexible member which includes a plurality of light-transmitting fibers and a narrow vertically elongated scanning head disposed at one end of said member and adjacent an article of glassware at the inspection station so as to accept reflected light from defects in the ware, said scanning head having fiber ends exposed and facing toward the ware along a substantially horizontal centerline which is generally tangential to the glassware and generally perpendicular to the centerline of the aforesaid beam of light so as to receive reflected light from defects in the ware, means effecting relative rotation between an article of glassware at said inspection station and said scanning head of said elongated member, a light detector operatively associated with an opposite end portion of said elongated receiving and transmitting device, and means connected with and operated by said detector to cause said rejection means to operate when defective glassware is transported to said rejection station from the inspection station.

2. The combination in glassware inspection apparatus as set forth in claim 1 wherein said centerline of said beam of light is tangential with respect to an inner surface of an article of glassware at the inspection station.

3. The combination in glassware inspection apparatus as set forth in claim 1 wherein the vertical dimension of the aggregate exposed fiber end area at said scanning head is at least six times the horizontal dimension thereof.

* * * * *